(12) United States Patent
Takeshita et al.

(10) Patent No.: US 11,781,998 B2
(45) Date of Patent: Oct. 10, 2023

(54) INSPECTION METHOD AND INSPECTION DEVICE FOR MEMBRANE ELECTRODE ASSEMBLY

(71) Applicants: TOYOTA JIDOSHA KABUSHIKI KAISHA, Toyota (JP); HITACHI HIGH-TECH SCIENCE CORPORATION, Tokyo (JP)

(72) Inventors: Shinya Takeshita, Toyota (JP); Toshiyuki Takahara, Gotemba (JP)

(73) Assignees: TOYOTA JIDOSHA KABUSHIKI KAISHA, Toyota (JP); HITACHI HIGH-TECH SCIENCE CORPORATION, Tokyo (JP)

( * ) Notice: Subject to any disclaimer, the term of this patent is extended or adjusted under 35 U.S.C. 154(b) by 82 days.

(21) Appl. No.: 17/670,910

(22) Filed: Feb. 14, 2022

(65) Prior Publication Data

US 2022/0291152 A1 Sep. 15, 2022

(30) Foreign Application Priority Data

Mar. 15, 2021 (JP) .................................. 2021-041216

(51) Int. Cl.
*G01N 23/18* (2018.01)
*G01N 23/04* (2018.01)
(Continued)

(52) U.S. Cl.
CPC ........... *G01N 23/18* (2013.01); *G01B 15/025* (2013.01); *G01N 23/04* (2013.01); *G01N 23/083* (2013.01);
(Continued)

(58) Field of Classification Search
CPC ...... G01N 23/18; G01N 23/04; G01N 23/083; G01N 2223/04; G01N 2223/401; G01N 2223/652; G01N 2223/405; G01B 15/025; G01B 15/02; H01M 4/881; H01M 8/0273; H01M 8/1004
See application file for complete search history.

(56) References Cited

U.S. PATENT DOCUMENTS

2010/0316187 A1* 12/2010 Matoba ................ G01N 23/083
378/58
2021/0262949 A1 8/2021 Takeshita et al.

FOREIGN PATENT DOCUMENTS

JP 2017162745 A 9/2017
JP 2021135125 A 9/2021

* cited by examiner

*Primary Examiner* — Kiho Kim
(74) *Attorney, Agent, or Firm* — Hunton Andrews Kurth LLP

(57) ABSTRACT

An inspection method of a membrane electrode assembly includes a first process of acquiring an X-ray transmission image of the membrane electrode assembly, a second process of identifying a luminance-reduced region having a luminance lower than a luminance of a surrounding region in the X-ray transmission image acquired in the first process, a third process of correcting the luminance of the luminance-reduced region identified in the second process, in accordance with a planar size of the luminance-reduced region, based on a correlation between a planar size of a foreign matter in the membrane electrode assembly and change in luminance due to diffraction of X-rays, and a fourth process of finding a thickness of the foreign matter in the membrane electrode assembly based on the luminance corrected in the third process.

6 Claims, 5 Drawing Sheets

(51) Int. Cl.
*G01N 23/083* (2018.01)
*G01B 15/02* (2006.01)
(52) U.S. Cl.
CPC ... *G01N 2223/04* (2013.01); *G01N 2223/401* (2013.01); *G01N 2223/652* (2013.01)

INSPECTION METHOD AND INSPECTION DEVICE FOR MEMBRANE ELECTRODE ASSEMBLY

CROSS-REFERENCE TO RELATED APPLICATION

This application claims priority to Japanese Patent Application No. 2021-041216 filed on Mar. 15, 2021, incorporated herein by reference in its entirety.

BACKGROUND

1. Technical Field

The present disclosure relates to an inspection method and an inspection device for a membrane electrode assembly.

2. Description of Related Art

With respect to an inspection method for a membrane electrode assembly for a fuel cell, for example, technology disclosed in Japanese Unexamined Patent Application Publication No. 2017-162745 (JP 2017-162745 A) takes note of the fact that X-rays are absorbed by catalyst particles contained in electrolyte membranes, and calculates the supported amount of catalyst particles in the electrolyte membranes based on X-ray transmittance calculated from the difference between X-ray emission intensity and detection intensity.

SUMMARY

Foreign matter having X-ray absorption capabilities, such as Fe particles, may become intermingled in the membrane electrode assembly at the time of manufacturing. The present disclosure provides an inspection method and an inspection device for a membrane electrode assembly that enable detection of the size of such foreign matter using X-rays with a high level of precision.

The present disclosure can be realized in the following aspects.

According to a first aspect of the present disclosure, an inspection method of a membrane electrode assembly is provided. The inspection method includes a first process of acquiring an X-ray transmission image of the membrane electrode assembly, a second process of identifying a luminance-reduced region having a luminance lower than a luminance of a surrounding region in the X-ray transmission image acquired in the first process, a third process of correcting the luminance of the luminance-reduced region identified in the second process, in accordance with a planar size of the luminance-reduced region, based on a correlation between a planar size of a foreign matter in the membrane electrode assembly and change in luminance due to diffraction of X-rays, and a fourth process of finding a thickness of the foreign matter in the membrane electrode assembly based on the luminance corrected in the third process. According to this aspect, the thickness of the foreign matter can be found as the size of the foreign matter in the membrane electrode assembly with a high level of precision, by correcting the effects of diffraction of X-rays on the luminance of the X-ray transmission image.

The above aspect may further include a fifth process of finding a three-dimensional size of the foreign matter, based on the thickness found in the fourth process and the planar size of the luminance-reduced region. According to this aspect, the three-dimensional size of the foreign matter can be found as the size of the foreign matter in the membrane electrode assembly with a high level of precision.

The above aspect may further include a sixth process of performing quality determination processing for determining whether the membrane electrode assembly is defective or non-defective, by comparing the three-dimensional size of the foreign matter found in the fifth process with a defect determination threshold value set in advance.

The present disclosure can be realized in various aspects such as, for example, an inspection device and an inspection system for a membrane electrode assembly, in addition to the above-described aspects as an inspection method of a membrane electrode assembly.

Another aspect of the disclosure provides an inspection device of a membrane electrode assembly. The inspection device of the membrane electrode assembly includes an acquisition unit configured to acquire an X-ray transmission image of the membrane electrode assembly, and a processing unit configured to identify a luminance-reduced region having a luminance lower than a luminance of a surrounding region in the X-ray transmission image, correct the luminance of the luminance-reduced region in accordance with a planar size of the luminance-reduced region, based on a correlation between a planar size of a foreign matter in the membrane electrode assembly and change in luminance due to diffraction of X-rays, and find a thickness of the foreign matter in the membrane electrode assembly based on the corrected luminance.

In the above aspect, the processing unit may be configured to find a three-dimensional size of the foreign matter, based on the thickness found by the processing unit and the planar size of the luminance-reduced region.

In the above aspect, the processing unit may be configured to perform quality determination processing for determining whether the membrane electrode assembly is defective or non-defective, by comparing the three-dimensional size of the foreign matter with a defect determination threshold value set in advance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
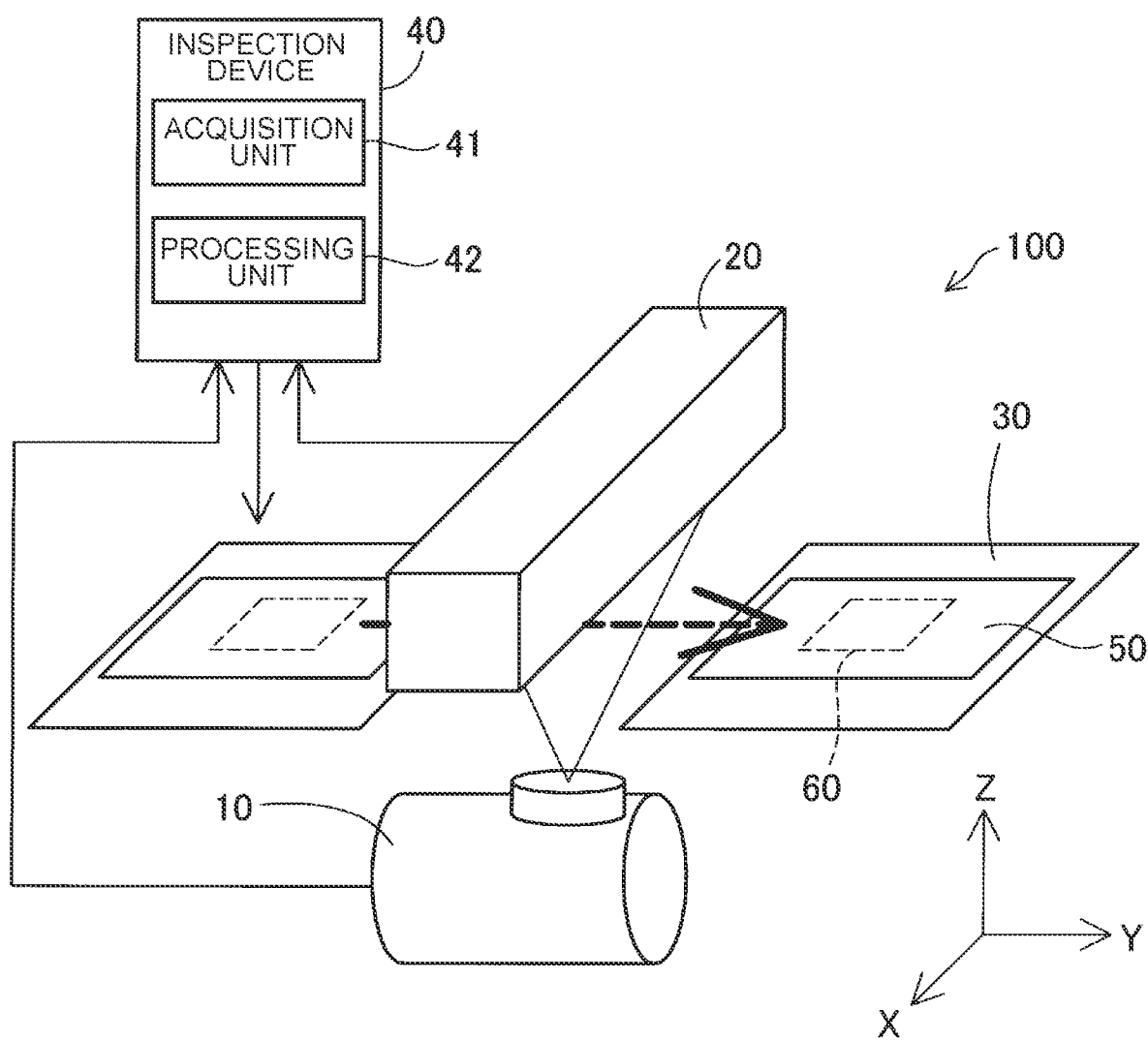
FIG. 1 is an explanatory diagram of an inspection system used for inspecting a membrane electrode assembly.

FIG. 1 is an explanatory diagram of an inspection system 100 used for inspecting a membrane electrode assembly. In the present embodiment, the inspection system 100 includes an X-ray source 10, a detecting camera 20, a stage 30, and an inspection device 40. A membrane electrode assembly 50 is placed on the stage 30. FIG. 1 shows the X, Y, and Z directions that are orthogonal to each other. The Z direction is the thickness direction of the membrane electrode assembly 50. The Y direction is the transport direction of the stage 30. The X direction is a direction orthogonal to the Y direction and the Z direction. The X direction and the Y direction are the planar directions of the membrane electrode assembly 50, and are lateral directions in the present embodiment.

The X-ray source 10 emits X-rays toward the membrane electrode assembly 50 placed on the stage 30. In the present embodiment, the stage 30 is provided with an opening 60. The X-ray source 10 irradiates the membrane electrode assembly 50 with X-rays from below, through the opening 60. As for the X-ray source 10, a water-cooled or air-cooled X-ray tube may be used, for example, the tube voltage may be 15 kV to 50 kV, and the tube current may be 0.1 mA to 35 mA.

The detecting camera 20 is disposed so as to face the X-ray source 10 with the stage 30 interposed therebetween. In the present embodiment, the detecting camera 20 is disposed above the stage 30, facing downward. The detecting camera 20 has a predetermined pixel resolution and luminance resolution, and images the membrane electrode assembly 50 irradiated by X-rays to generate an X-ray transmission image. Foreign matter detected by the detecting camera 20 is foreign matter having X-ray absorption capabilities, and is iron-based foreign matter such as iron or stainless steel in the present embodiment, for example. As the detecting camera 20, charge-coupled device (CCD) type or complementary metal-oxide semiconductor (CMOS) type linear image sensors or area image sensors can be used. The image sensor may be a time delay integration (TDI) type sensor. The positional relation between the detecting camera 20 and the X-ray source 10 may be inverted in the up-down direction.

In the present application, "luminance" in an X-ray transmission image has the same meaning as "signal intensity". Specifically, the luminance of each pixel represents the signal intensity of the X-rays transmitted through the membrane electrode assembly 50, representing that the higher the luminance is, the higher the signal intensity of the X-rays transmitted through the membrane electrode assembly 50 is. Any foreign matter having X-ray absorption capabilities that is present in the membrane electrode assembly 50 will absorb X-rays, and accordingly the signal intensity of the X-rays transmitted through the membrane electrode assembly 50 will become weak, and the luminance will decrease. As a result, regions where foreign matter exists in the X-ray transmission image appear as dark regions.

The stage 30 is configured to be movable in the lateral direction between the X-ray source 10 and the detecting camera 20. The stage 30 includes a fixing jig, omitted from illustration, for fixing the membrane electrode assembly 50 upon the stage 30. The stage 30 is transported and moved in the lateral direction by a moving device such as a linear actuator, a belt conveyor, or the like, which is omitted from illustration. A plurality of stages 30 may be prepared, and a plurality of membrane electrode assemblies 50 may be continuously inspected by successively moving the stages 30 between the X-ray source 10 and the detecting camera 20.

The inspection device 40 is configured of a computer including a central processing unit (CPU) and a storage device, and controls the X-ray source 10, the detecting camera 20, and the stage 30. The inspection device 40 includes an acquisition unit 41 that acquires X-ray transmission images taken by the detecting camera 20, a processing unit 42 that finds the size of foreign matter in the membrane electrode assembly 50 based on the X-ray transmission images acquired by the acquisition unit 41. The acquisition unit 41 and the processing unit 42 are functional units realized by the CPU that is provided in the inspection device 40 executing a program stored in the storage device. Note that the acquisition unit 41 and the processing unit 42 may be configured as a circuit.

The membrane electrode assembly 50 is a member in which catalyst electrode layers are formed on both faces of an electrolyte membrane. The electrolyte membrane is, for example, a solid polymer membrane formed of a fluorinated sulfonic acid polymer. The catalyst electrode layer is configured of a catalyst-supporting carbon that supports catalyst particles such as platinum, and an electrolyte resin, for example. In the present embodiment, a gas diffusion layer configured of carbon paper, carbon non-woven fabric, or the like, is disposed on one or both faces of the membrane electrode assembly 50, and inspection is performed in a state in which a resin frame member is fixed by an adhesive around the membrane electrode assembly 50. After the inspection, the fuel cell is completed by disposing a pair of gas separators so as to sandwich a membrane electrode assembly 50 in which no foreign matter was detected, and the frame member. Note that inspection of the membrane electrode assembly 50 may be performed in a state in which the frame member and the gas diffusion layer are not disposed thereupon.

Figure 2:
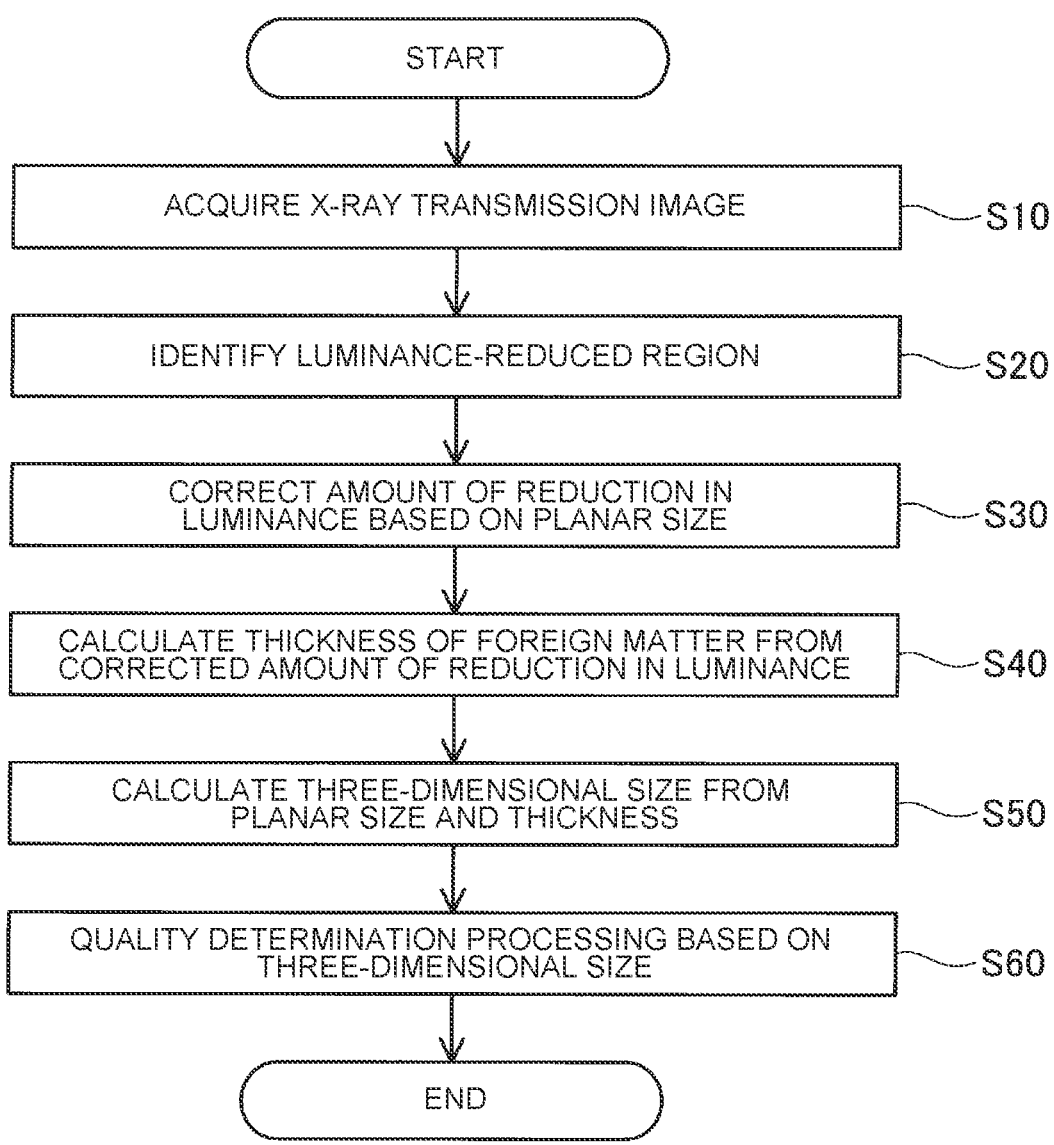
FIG. 2 is a process diagram showing a method for inspecting the membrane electrode assembly.

FIG. 2 is a process diagram showing an inspection method of the membrane electrode assembly executed in the inspection device 40. First, in step S10, the inspection device 40 controls the X-ray source 10, the detecting camera 20, and the stage 30 to irradiate the membrane electrode assembly 50 with X-rays, and the acquisition unit 41 acquires an X-ray transmission image. The process of step S10 is also referred to as a first process.

In step S20, the processing unit 42 of the inspection device 40 identifies luminance-reduced regions from the X-ray transmission image acquired in step S10. The process of step S20 is also referred to as a second process.

Figure 3:
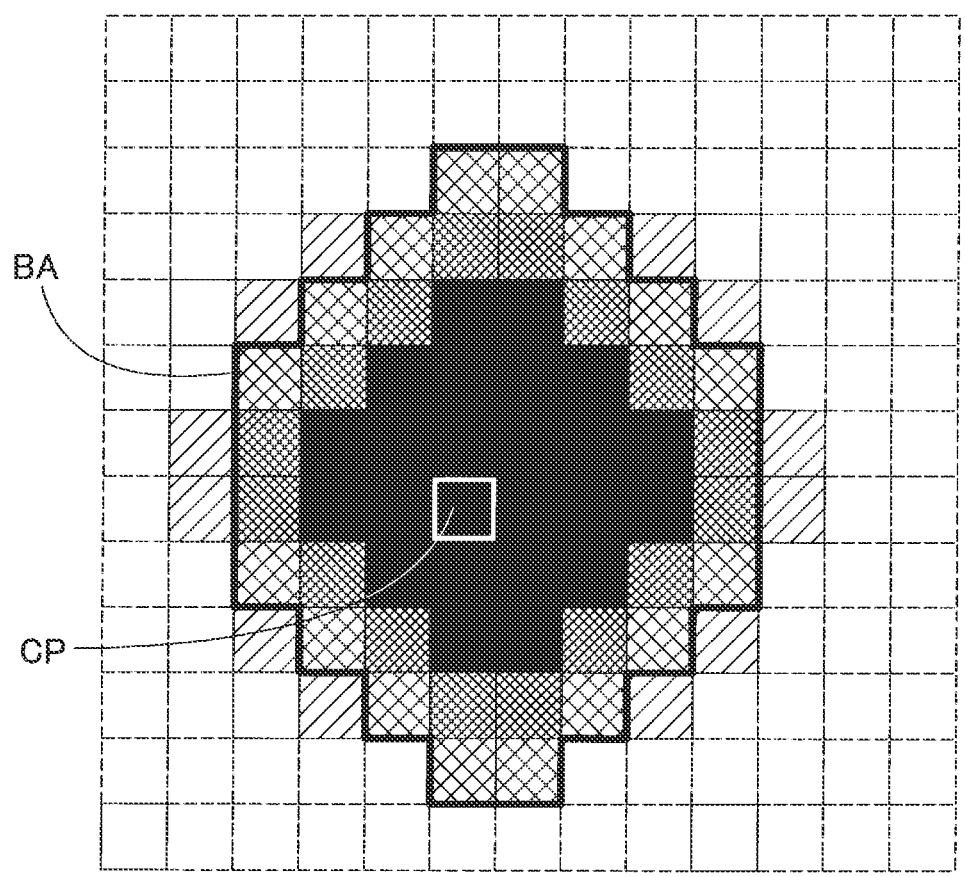
FIG. 3 is an enlarged schematic view of a part of an X-ray transmission image.

FIG. 3 is an enlarged schematic view of a part of an X-ray transmission image. The processing unit 42 identifies a region in the X-ray transmission image having lower luminance than the surrounding region as being a luminance-reduced region BA. Specifically, in the present embodiment, a set of pixels having a luminance value that is 10 times or more darker than the luminance values of the surrounding pixels is identified as the luminance-reduced region BA. In FIG. 3, the luminance-reduced region BA is illustrated surrounded by a thick line. The processing unit 42 identifies the amount of reduction in luminance of a pixel CP at the center of the luminance-reduced region BA as the amount of reduction in luminance of the luminance-reduced region BA. The amount of reduction in luminance refers to the amount in reduction of luminance from the maximum luminance of the X-ray transmission image, and represents an X-ray attenuation amount. The greater the amount of reduction in luminance is, the smaller the luminance value is, and the smaller the amount of reduction in luminance is, the greater the luminance value is.

In step S30 of FIG. 2, the processing unit 42 corrects the amount of reduction in luminance of the luminance-reduced region in accordance with the planar size of the luminance-reduced region identified in step S20. In the present embodiment, the planar size is the area of the luminance-reduced region BA.

Figure 4:
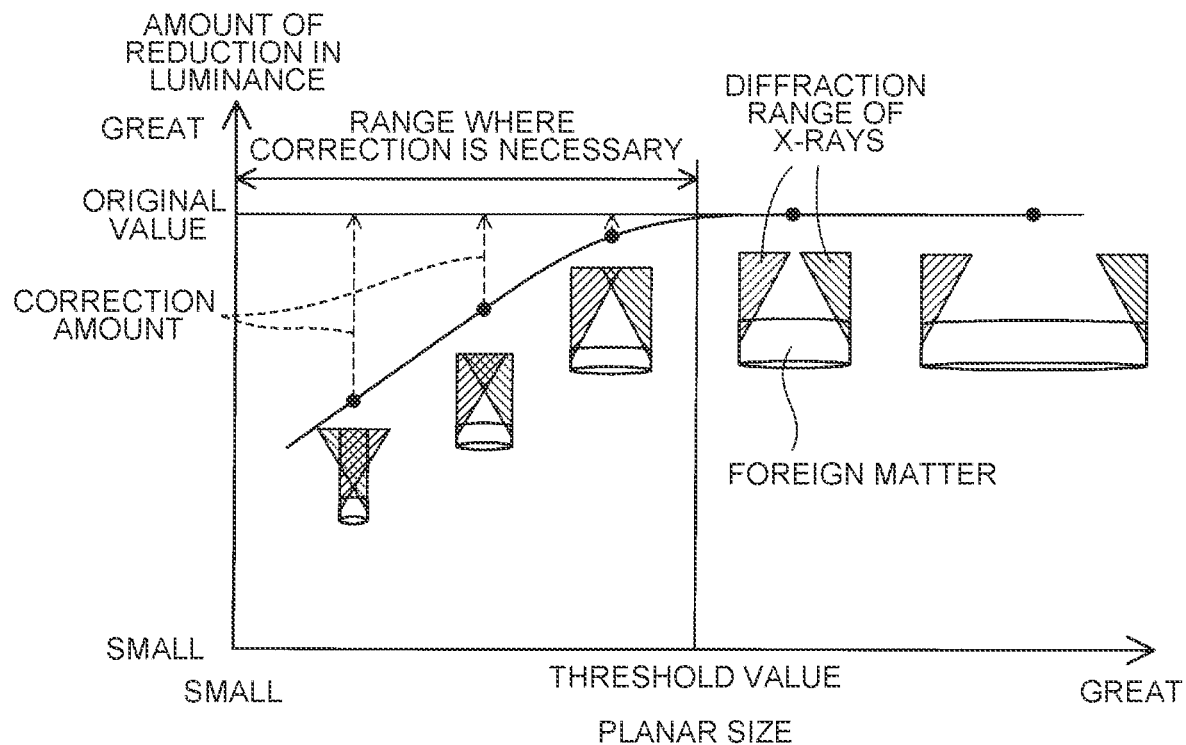
FIG. 4 is an explanatory diagram showing a relation between the planar size of foreign matter and the amount of reduction in luminance.

FIG. 4 is an explanatory diagram showing a relation between the planar size of foreign matter and the amount of reduction in luminance. The horizontal axis of the graph shown in FIG. 4 is the planar size of the foreign matter, and the vertical axis is the amount of reduction in luminance. It is known that X-rays, like light, have a property of curving around behind obstacles. Accordingly, when foreign matter is present in the membrane electrode assembly 50, the X-rays are diffracted to behind the foreign matter (upper side in FIG. 4) and affects the amount of reduction in luminance in the luminance-reduced region. The magnitude of the effect changes in accordance with the planar size of the foreign matter. Specifically, as shown in FIG. 4, when the planar size of the foreign matter is small, the amount of X-rays curving around behind the foreign matter is great, and accordingly the amount of reduction in luminance is small. On the other hand, when the planar size of the foreign matter is large, the amount of X-rays curving around behind the foreign matter is relatively small with respect to the planar size of the foreign matter, and accordingly the amount of reduction in luminance becomes great. However, X-ray diffraction occurs at the edges of the foreign matter, and accordingly when the planar size of the foreign matter increases beyond a certain level, the X-ray diffraction does not affect the amount of reduction in luminance at the center of the foreign matter. Due to such a phenomenon, the amount of reduction in luminance with respect to the planar size of the foreign matter becomes smaller as the planar size of the foreign matter becomes smaller in a range in which the planar size of the foreign matter is less than a predetermined value (threshold value), and in a range in which the planar size is no smaller than the threshold value, the amount of reduction in luminance becomes constant regardless of the planar size of the foreign matter, as shown in FIG. 4. Note that when the planar size of the foreign matter is within the size range assumed in this embodiment (no more than approximately 1 mm in diameter), the correlation between the planar size of the foreign matter and the amount of reduction in luminance is unchanged even when the thickness of the foreign matter differs.

In step S30, the processing unit 42 performs correction based on the correlation between the planar size of the foreign matter and the change in luminance shown in FIG. 4, until the amount of reduction in luminance in the luminance-reduced region BA is the original amount of reduction in luminance with the effects of diffraction of X-rays eliminated. Specifically, when the planar size of the luminance-reduced region BA is smaller than the threshold value, the smaller the planar size is, the greater the correction amount for increasing the amount of reduction in luminance is. Also, the processing unit 42 does not perform correction when the planar size of the luminance-reduced region BA is no smaller than the threshold value. The relation between the planar size of the foreign matter and the change in luminance can be set in advance as a function or a map, by performing simulations and experiments. The processing unit 42 can perform the above-described correction by using such a function or a map. The process of step S30 is also referred to as a third process.

In step S40 of FIG. 2, the processing unit 42 finds the thickness of the foreign matter present in the luminance-reduced region BA based on the corrected amount of reduction in luminance.

Figure 5:
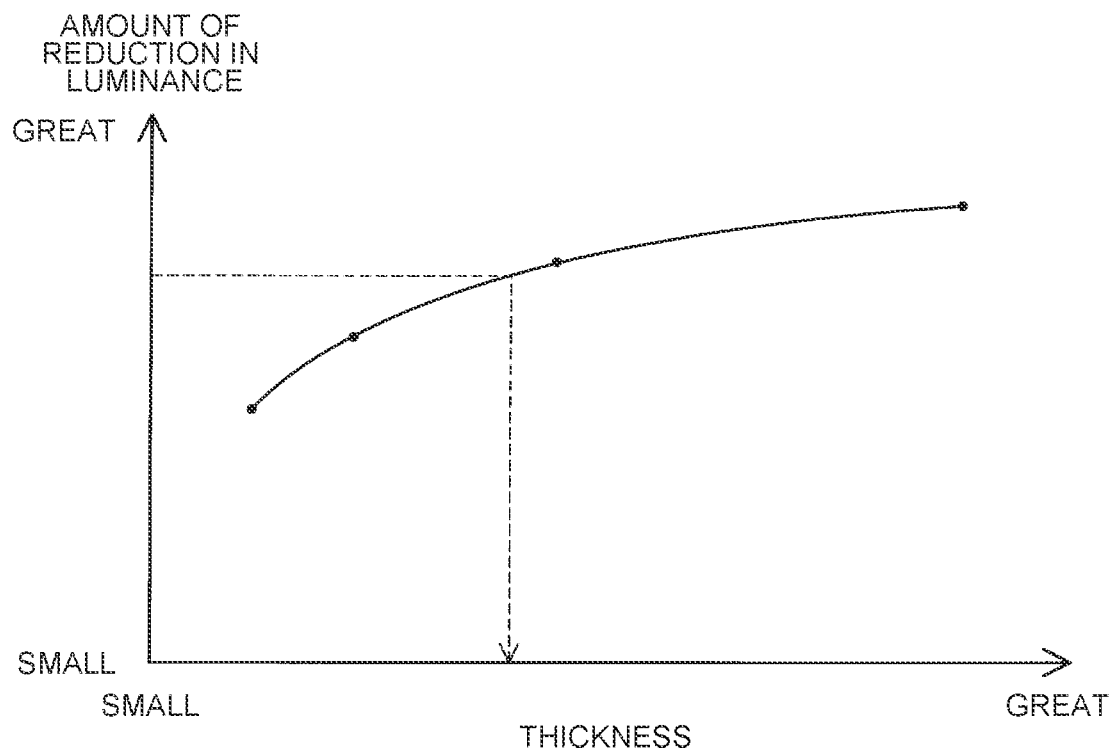
FIG. 5 is an explanatory diagram showing a relation between the thickness of foreign matter and the amount of reduction in luminance.

FIG. 5 is an explanatory diagram showing a relation between the thickness of foreign matter and the amount of reduction in luminance. The horizontal axis of the graph shown in FIG. 5 indicates the thickness of the foreign matter, and the vertical axis indicates the amount of reduction in luminance. Foreign matter having X-ray absorption capabilities absorbs more X-rays the greater the thickness thereof is. Accordingly, the greater the thickness of the foreign matter is, the larger the amount of reduction in luminance is, as shown in FIG. 5. The processing unit 42 uses a function or a map in which the relation between the thickness of the foreign matter and the amount of reduction in luminance is determined in advance by simulation or experiment, and from the amount of reduction in luminance corrected in step S30, the thickness corresponding to the amount of reduction in luminance thereof is found. The process of step S40 is also referred to as a fourth process.

In step S50 of FIG. 2, the processing unit 42 finds the three-dimensional size of the foreign matter based on the thickness found in step S40 and the planar size of the luminance-reduced region BA. In the present embodiment, the surface area of the foreign matter is found in this step S50. Specifically, the surface area of a columnar shape having the luminance-reduced region BA identified in step S20 on the upper face and the lower face, and having the thickness found in step S40 as the height, is found. The process of step S50 is also referred to as a fifth process.

In step S60, the processing unit 42 performs quality determination processing for determining whether the membrane electrode assembly 50 is defective or non-defective, by comparing the three-dimensional size of the foreign matter found in step S50 with a defect determination threshold value set in advance. When the three-dimensional size of the foreign matter found in step S50 is no less than the defect determination threshold value, the processing unit 42 determines that the membrane electrode assembly 50 is defective, and when the three-dimensional size of the foreign matter found in step S50 is less than the defect determination threshold value, determines that the membrane electrode assembly 50 is non-defective. Note that when a plurality of luminance-reduced regions BA is identified in step S20, the processing from the above steps S30 to S60 is executed for all the luminance-reduced regions BA, and when even one thereof is determined to be defective, the membrane electrode assembly 50 is determined to be defective. Also, when no luminance-reduced region is identified in the membrane electrode assembly 50 in step S20, the processing from step S30 to step S50 are skipped, and in step S60, the membrane electrode assembly 50 is determined to be non-defective. The inspection device 40 may output determination results of the quality determination processing by an output device such as a display device connected to the inspection device 40.

When quality determination of whether the membrane electrode assembly 50 is defective or non-defective is made as described above in the inspection system 100, the membrane electrode assemblies 50 determined to be non-defective are used to manufacture fuel cells. The process diagram shown in FIG. 2 shows an inspection process for one membrane electrode assembly 50. Accordingly, the membrane electrode assemblies 50 can be consecutively inspected by repeatedly executing the processes of the steps S10 to S60 described above.

According to the inspection method of the membrane electrode assembly 50 in the present embodiment described above, the size of foreign matter in the membrane electrode assembly 50, the thickness of the foreign matter in particular, can be found with a high level of precision, by correcting the influence of the diffraction of X-rays on the luminance of the X-ray transmission image. Further, in the present embodiment, the thickness of the foreign matter is found based on the corrected amount of reduction in luminance, and the three-dimensional size of the foreign matter is found based on the thickness and the planar size of the luminance-reduced region, and accordingly the three-dimensional size of the foreign matter in the membrane electrode assembly 50 can be found with a high level of precision.

Further, in the present embodiment, the foreign matter can be detected by using the X-ray transmission image alone, and accordingly inspection can be easily performed without using other methods such as component analysis like fluorescent X-ray analysis and so forth. Accordingly, the cycle time required for inspection of the membrane electrode assembly 50 is reduced, and fuel cells can be efficiently manufactured.

Figure 6:
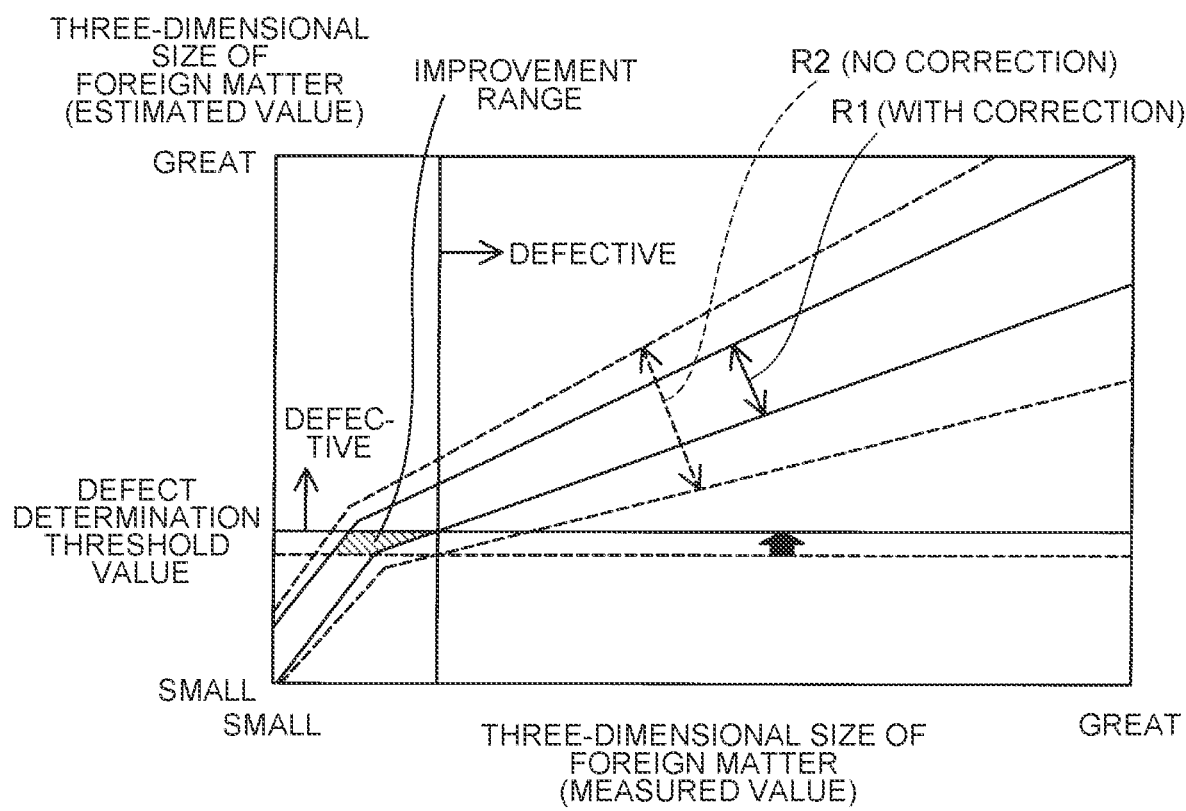
FIG. 6 is a diagram for describing effects of an embodiment.

FIG. 6 is a diagram for describing effects of the embodiment. In the graph shown in FIG. 6, the horizontal axis represents the measured value of the three-dimensional size of the foreign matter, and the vertical axis represents the value of the three-dimensional size of the foreign matter found by the above-described inspection method. The value found by the above inspection method will hereinafter be referred to as "estimated value". The measured value was found by analyzing a three-dimensional computed tomography (CT) image of the foreign matter. In FIG. 6, a region representing a range of 3σ in which falls data of foreign matter, of which the amount of reduction in luminance has been corrected in step S30 of the above inspection method, is denoted by "R1", and a region representing a range of 3σ in which falls data of foreign matter that is not corrected is denoted by "R2". These regions are regions statistically obtained by finding measured values and estimated values for thirty foreign matter samples having various shapes.

As shown in FIG. 6, in the present embodiment, when the amount of reduction in luminance is corrected in accordance with the planar size of the foreign matter, by step S30 of the inspection method, the measured value of the foreign matter size and the estimated value thereof then have a stronger correlation than when the amount of reduction in luminance is not corrected. That is to say, by correcting the amount of reduction in luminance, the three-dimensional size of the foreign matter can be estimated with a high level of precision. As a result, it is not necessary to set a large margin for the defect determination threshold value for quality determination of whether the membrane electrode assembly 50 is defective or non-defective, and accordingly the defect determination threshold value can be set to a great value. Consequently, part of the membrane electrode assemblies 50 that are determined to be defective without correction (the membrane electrode assemblies 50 of which the estimated size of the foreign matter corresponds to the hatched portion in FIG. 6) can be determined to be non-defective, and the yield of the membrane electrode assemblies 50 can be improved.

B. Other Embodiments

B-1

In the above embodiment, quality determination of whether the membrane electrode assembly 50 is defective or non-defective is performed based on the three-dimensional size of the foreign matter. Conversely, quality determination of whether the membrane electrode assembly 50 is defective or non-defective may be performed based on the thickness of the foreign matter. In this case, step S50 of the inspection method shown in FIG. 2 is omitted, and in step S60, quality determination of whether the membrane electrode assembly 50 is defective or non-defective is performed by comparing the thickness of the foreign matter with a predetermined quality determination threshold value.

B-2

In the above embodiment, the processing unit 42 identifies the amount of reduction in luminance of a pixel at the center of the luminance-reduced region BA as the amount of reduction in luminance of the luminance-reduced region BA. Conversely, the processing unit 42 may identify the largest amount of reduction in luminance in the luminance-reduced region BA as the amount of reduction in luminance in the luminance-reduced region BA.

B-3

In the above embodiment, the processing unit 42 finds the area of the luminance-reduced region BA as the planar size of the luminance-reduced region BA. Conversely, the processing unit 42 may find the largest dimension of the luminance-reduced region BA in the planar direction or the larger of sizes in the X and Y directions as the planar size of the luminance-reduced region BA.

B-4

In the above embodiment, the processing unit 42 finds the surface area of the foreign matter as the three-dimensional size of the foreign matter. Conversely, the processing unit 42 may find the volume of the foreign matter by calculating the product of the thickness found in step S40 of FIG. 2 and the planar size of the luminance-reduced region BA as the three-dimensional size of the foreign matter.

B-5

In the above embodiment, the processing unit 42 corrects the amount of reduction in luminance of the luminance-reduced region BA. Conversely, the processing unit 42 may correct the luminance value of the luminance-reduced region BA. Both the amount of reduction in luminance and the luminance value are indicators of luminance, and accordingly it can be said that both correction of the amount of reduction in luminance and correction of the luminance value correct the luminance. Note however, that when the luminance value is great, the amount of reduction in luminance is small, and when the luminance value is small, the amount of reduction in luminance is great. Accordingly, when correcting the luminance value in step S30 of FIG. 2, when the planar size of the luminance-reduced region BA is smaller than the threshold value, the smaller the planar size is, the greater the processing unit 42 sets the correction amount to be for reducing the luminance value.

The present disclosure is not limited to the embodiments above, and can be realized with various configurations without departing from the scope thereof. For example, the technical features of the embodiments corresponding to the technical features in each mode described in the section of the summary of the disclosure may be replaced or combined appropriately to solve part or all of the above issues or to achieve part or all of the above effects. When the technical features are not described as essential in this specification, such technical features can be omitted as appropriate.

What is claimed is:

1. An inspection method of a membrane electrode assembly, the inspection method comprising:
   a first process of acquiring an X-ray transmission image of the membrane electrode assembly;
   a second process of identifying a luminance-reduced region having a luminance lower than a luminance of a surrounding region in the X-ray transmission image acquired in the first process;

a third process of correcting the luminance of the luminance-reduced region identified in the second process, in accordance with a planar size of the luminance-reduced region, based on a correlation between a planar size of a foreign matter in the membrane electrode assembly and change in luminance due to diffraction of X-rays; and a fourth process of finding a thickness of the foreign matter in the membrane electrode assembly based on the luminance corrected in the third process.

2. The inspection method according to claim 1, further comprising a fifth process of finding a three-dimensional size of the foreign matter, based on the thickness found in the fourth process and the planar size of the luminance-reduced region.

3. The inspection method according to claim 2, further comprising a sixth process of performing quality determination processing for determining whether the membrane electrode assembly is defective or non-defective, by comparing the three-dimensional size of the foreign matter found in the fifth process with a defect determination threshold value set in advance.

4. An inspection device of a membrane electrode assembly, the inspection device comprising:

an acquisition unit configured to acquire an X-ray transmission image of the membrane electrode assembly; and a processing unit configured to identify a luminance-reduced region having a luminance lower than a luminance of a surrounding region in the X-ray transmission image, correct the luminance of the luminance-reduced region in accordance with a planar size of the luminance-reduced region, based on a correlation between a planar size of a foreign matter in the membrane electrode assembly and change in luminance due to diffraction of X-rays, and find a thickness of the foreign matter in the membrane electrode assembly based on the corrected luminance.

5. The inspection device according to claim 4, wherein the processing unit is configured to find a three-dimensional size of the foreign matter, based on the thickness found by the processing unit and the planar size of the luminance-reduced region.

6. The inspection device according to claim 5, wherein the processing unit is configured to perform quality determination processing for determining whether the membrane electrode assembly is defective or non-defective, by comparing the three-dimensional size of the foreign matter with a defect determination threshold value set in advance.

\* \* \* \* \*